(12) United States Patent
Tremblay et al.

(10) Patent No.: US 11,054,437 B2
(45) Date of Patent: Jul. 6, 2021

(54) METHOD AND SYSTEM FOR AIRCRAFT SIDESLIP GUIDANCE

(71) Applicant: C SERIES AIRCRAFT LIMITED PARTNERSHIP, Mirabel (CA)

(72) Inventors: Luc Tremblay, L'île Bizard (CA); Mark Metivet, Lachine (CA); Francis Meunier, Montreal (CA); Marc-Antoine Delarche, Seattle, WA (US)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 353 days.

(21) Appl. No.: 16/018,320

(22) Filed: Jun. 26, 2018

(65) Prior Publication Data

US 2019/0004081 A1 Jan. 3, 2019

Related U.S. Application Data

(60) Provisional application No. 62/526,115, filed on Jun. 28, 2017.

(51) Int. Cl.
| | | |
|---|---|---|
| *G01P 13/02* | (2006.01) | |
| *G05D 1/00* | (2006.01) | |
| *B64D 45/00* | (2006.01) | |
| *G08G 5/00* | (2006.01) | |
| *B64C 13/50* | (2006.01) | |
| *B64D 43/00* | (2006.01) | |

(52) U.S. Cl.
CPC .......... *G01P 13/025* (2013.01); *B64C 13/503* (2013.01); *B64D 43/00* (2013.01); *B64D 45/00* (2013.01); *G05D 1/0072* (2013.01); *G08G 5/0047* (2013.01)

(58) Field of Classification Search
CPC ...................................... G01P 13/025
See application file for complete search history.

(56) References Cited

U.S. PATENT DOCUMENTS

| | | | |
|---|---|---|---|
| 4,094,479 A | 6/1978 | Kennedy, Jr. | |
| 5,008,825 A | 4/1991 | Nadkarni et al. | |
| 5,050,086 A | 9/1991 | Lambregts | |
| 5,060,889 A * | 10/1991 | Nadkarni | G05D 1/0204 |
| | | | 244/183 |
| 5,113,346 A | 5/1992 | Orgun et al. | |
| 5,170,969 A | 12/1992 | Lin | |

(Continued)

FOREIGN PATENT DOCUMENTS

CN 103587681 A 2/2014

OTHER PUBLICATIONS

English translation of Chinese patent document No. CN 103587681A dated Feb. 19, 2014, Espacenet, https://worldwide.espacenet.com/publicationDetails/biblio?CC=CN&NR=103587681A& ..., accessed on May 26, 2017.

(Continued)

*Primary Examiner* — Michael A Berns
(74) *Attorney, Agent, or Firm* — Norton Rose Fulbright Canada LLP

(57) ABSTRACT

The present disclosure describes systems and methods associated with providing sideslip guidance for an aircraft. A sideslip offset based on aileron position is used to adjust an initial target sideslip, which is further modified using the actual sideslip of the aircraft.

17 Claims, 8 Drawing Sheets

(56) References Cited

U.S. PATENT DOCUMENTS

| | | | |
|---|---|---|---|
| 5,669,582 A | 9/1997 | Bryant et al. | |
| 8,423,206 B2* | 4/2013 | Shapiro | G05D 1/0833 701/3 |
| 8,527,116 B2 | 9/2013 | Ezerzere et al. | |
| 8,718,841 B2 | 5/2014 | Cherepinsky | |
| 9,360,869 B1* | 6/2016 | Wittmer | G05D 1/0202 |
| 10,386,859 B2* | 8/2019 | Delannoy | B64C 13/0421 |
| 10,890,463 B2* | 1/2021 | Tremblay | G08G 5/0021 |
| 2016/0214731 A1* | 7/2016 | Schmidt | B64D 31/06 |
| 2019/0004081 A1* | 1/2019 | Tremblay | G05D 1/0072 |

OTHER PUBLICATIONS

Amir Fleminger, Engine Inoperative Principles in a Twin Airplane, Dec. 6, 2007, www.pilotscafe.com/engine-inoperative-principles . . . , accessed on May 26, 2017.

* cited by examiner

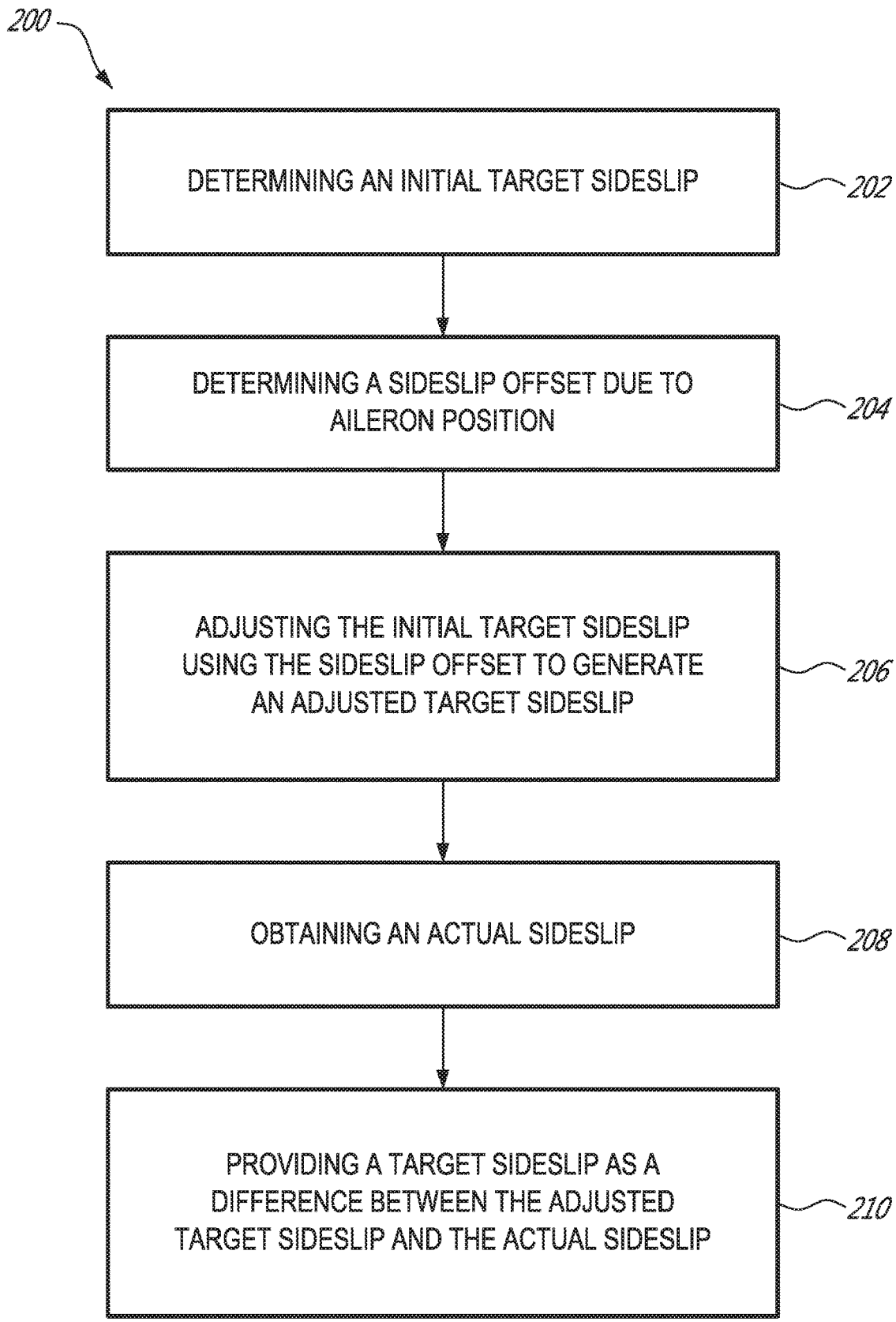

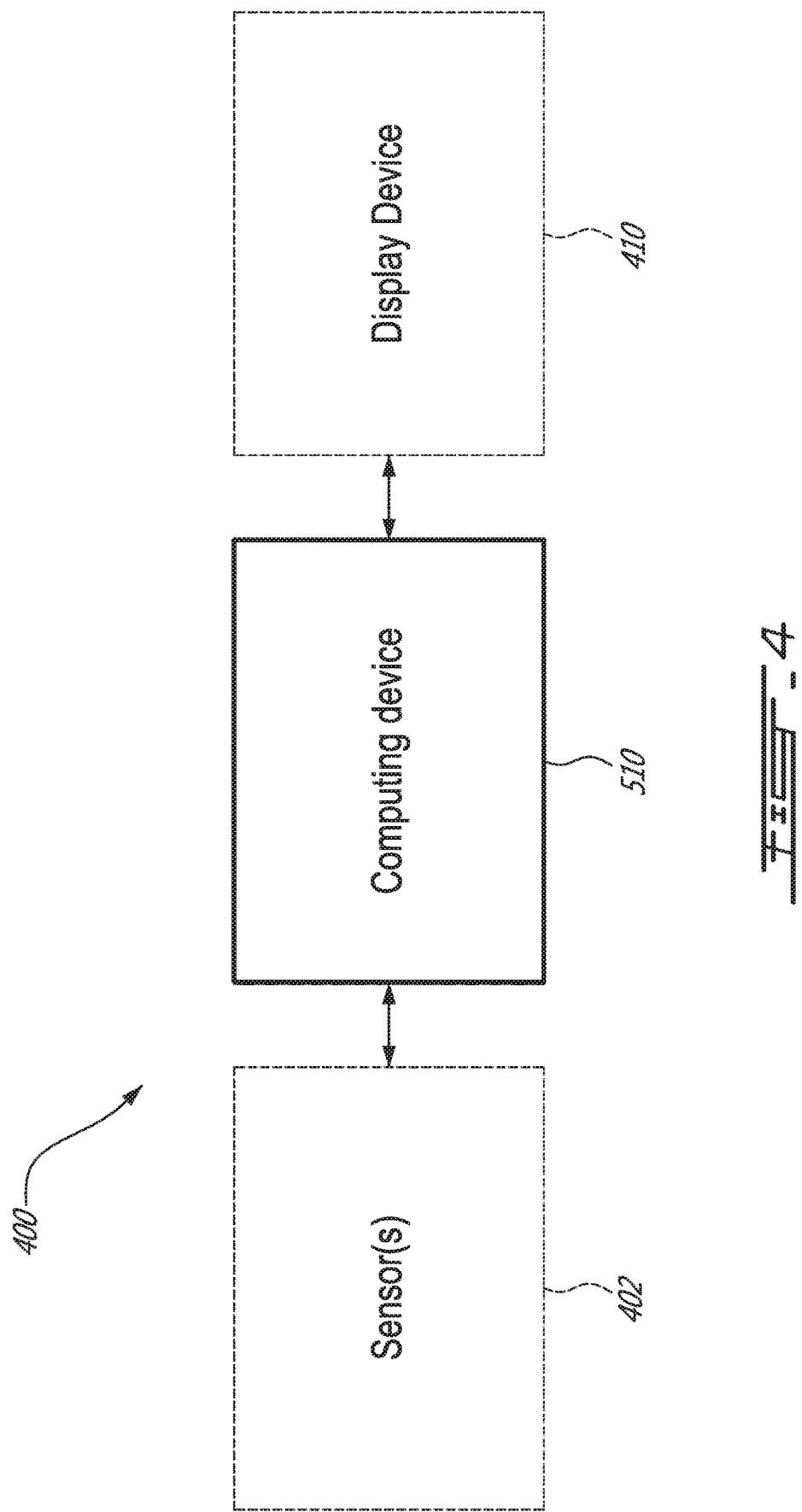

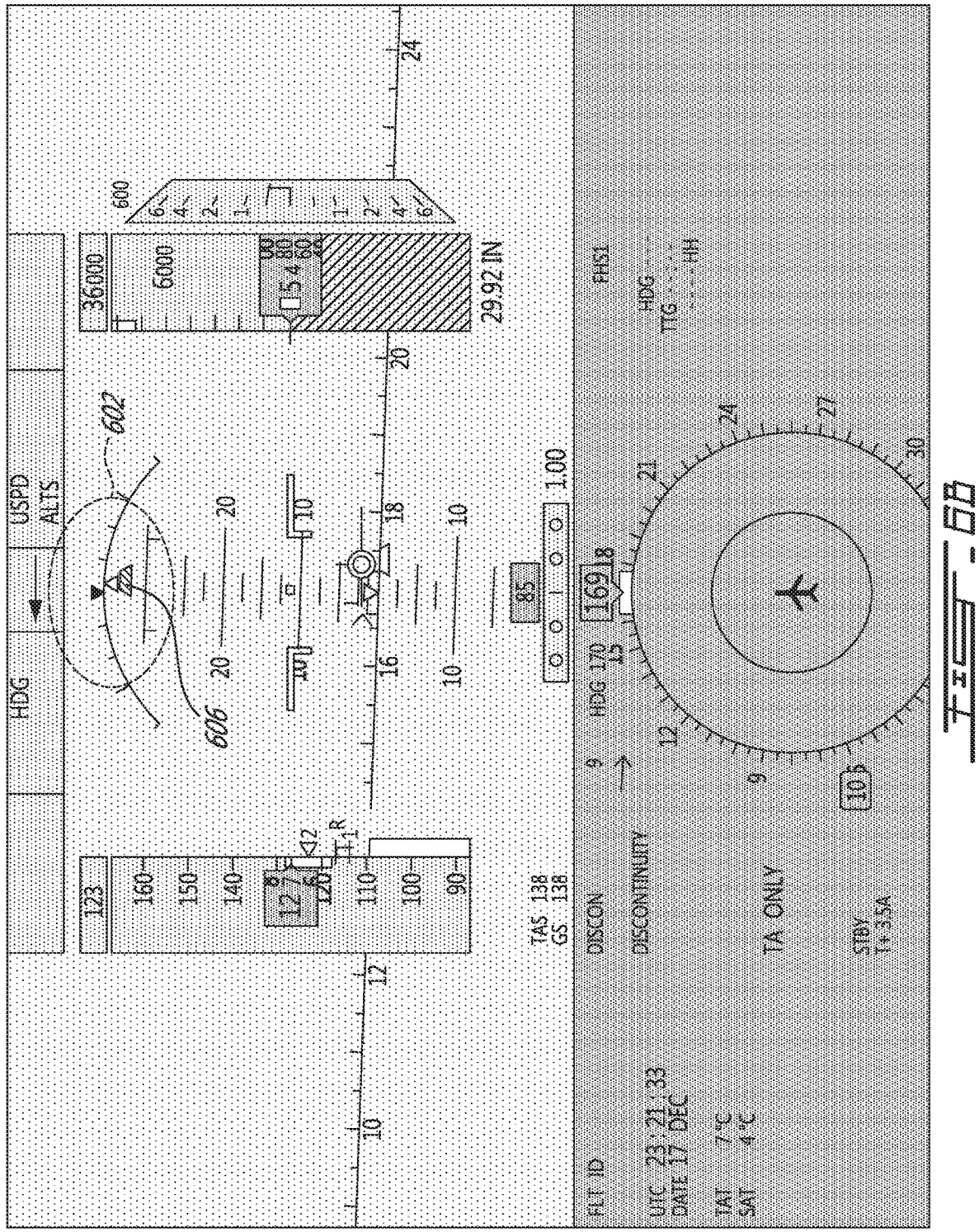

METHOD AND SYSTEM FOR AIRCRAFT SIDESLIP GUIDANCE

CROSS-REFERENCE TO RELATED APPLICATION(S)

This application relies for priority on U.S. Provisional Patent Application Ser. No. 62/526,115 filed on Jun. 28, 2017, the entire content of which is incorporated herein by reference.

TECHNICAL FIELD

The present disclosure relates generally to sideslip guidance for aircraft, and more particularly to sideslip guidance under a one engine inoperative (OEI) condition.

BACKGROUND OF THE ART

Sideslip in aerodynamics relates to the rotation of an aircraft centerline from the relative wind. The sideslip angle ($\beta$) is essentially the directional angle of attack of the aircraft and is a primary parameter in directional stability considerations. When an aircraft is operating with all engines operative (AEO), the objective is to obtain a sideslip angle of 0°.

The optimal conditions for sideslip of the aircraft change when the aircraft is operating under a one engine inoperative (OEI) condition. In such instances, a combination of roll and yaw inputs are entered by the pilot to bring back the wings level while maintaining a target heading. As a result, spoilers and ailerons are deployed. However, this is counterproductive as the deployment of these flight control surfaces increases drag on the aircraft.

Therefore, there is a need for improvement.

SUMMARY

The present disclosure describes systems and methods associated with providing sideslip guidance for an aircraft. A sideslip offset based on aileron position is used to adjust an initial target sideslip, which is further modified using the actual sideslip of the aircraft.

In accordance with a first aspect, there is provided a method for providing sideslip guidance for an aircraft. The method comprises determining an initial target sideslip based on current operating conditions of the aircraft, determining a sideslip offset based on an actual position of at least one aileron of the aircraft and a neutral position of the at least one aileron, adjusting the initial target sideslip using the sideslip offset to generate an adjusted target sideslip, obtaining an actual sideslip of the aircraft, and providing a target sideslip as a difference between the adjusted target sideslip and the actual sideslip.

In some embodiments, determining the initial target sideslip comprises using at least one of an airspeed of the aircraft and a flap configuration of the aircraft as the current operating conditions.

In some embodiments, determining the initial target sideslip comprises using an engine operating status for each engine of the aircraft as the current operating conditions.

In some embodiments, the method further comprises determining the actual position of the at least one aileron as an average of an actual position of a first aileron and an actual position of a second aileron.

In some embodiments, obtaining the actual sideslip of the aircraft comprises estimating the actual sideslip of the aircraft.

In some embodiments, estimating the actual sideslip comprises determining an initial sideslip estimate using aircraft operating parameters, and adjusting the initial sideslip estimate by a gain factor.

In some embodiments, the method further comprises detecting an engine failure of at least one engine of the aircraft, and when the engine failure is detected, determining an operating mode of the aircraft. In such embodiments, the method is performed when the operating mode of the aircraft is one of at takeoff when the engine failure occurs after the aircraft has passed an aircraft takeoff decision speed, and at an approach to landing when the engine failure occurs when the aircraft is above a decision height for a go-around maneuver.

In some embodiments, the operating mode at the approach to landing comprises having autopilot engaged.

In some embodiments, the method further comprises detecting an engine failure of at least one engine of the aircraft. In such embodiments, the method is performed when the engine failure is detected.

In some embodiments, providing the target sideslip comprises positioning a sideslip indicator on a display of the aircraft as a function of the target sideslip.

In some embodiments, the method further comprises visually modifying the display of the aircraft to indicate that the sideslip indicator is positioned as a function of the target sideslip.

In accordance with a further aspect, there is provided a system for providing sideslip guidance for an aircraft. The system comprises a processing unit and a non-transitory computer-readable memory having stored thereon program instructions. The program instructions are executable by the processing unit for determining an initial target sideslip based on current operating conditions of the aircraft, determining a sideslip offset based on an actual position of at least one aileron of the aircraft and a neutral position of the at least one aileron, adjusting the initial target sideslip using the sideslip offset to generate an adjusted target sideslip, obtaining an actual sideslip of the aircraft, and providing a target sideslip as a difference between the adjusted target sideslip and the actual sideslip.

In some embodiments, determining the initial target sideslip comprises using at least one of an airspeed of the aircraft and a flap configuration of the aircraft as the current operating conditions.

In some embodiments, determining the initial target sideslip comprises using an engine operating status for each engine of the aircraft as the current operating conditions.

In some embodiments, the program instructions are further executable by the processing unit for determining the actual position of the at least one aileron as an average of an actual position of a first aileron and an actual position of a second aileron.

In some embodiments, obtaining the actual sideslip of the aircraft comprises estimating the actual sideslip of the aircraft.

In some embodiments, estimating the actual sideslip comprises determining an initial sideslip estimate using aircraft operating parameters, and adjusting the initial sideslip estimate by a gain factor.

In some embodiments, the program instructions are further executable by the processing unit for detecting an engine failure of at least one engine of the aircraft, and when the engine failure is detected, determining an operating mode of the aircraft. In such embodiments, the program instructions are executed when the operating mode of the aircraft is one of at takeoff when the engine failure occurs after the aircraft has passed an aircraft takeoff decision speed, and at an approach to landing when the engine failure occurs when the aircraft is above a decision height for a go-around maneuver.

In some embodiments, the operating mode at the approach to landing comprises having autopilot engaged.

In some embodiments, the program instructions are further executable by the processing unit for detecting an engine failure of at least one engine of the aircraft. In such embodiments, the program instructions are executed when the engine failure is detected.

In some embodiments, providing the target sideslip comprises positioning a sideslip indicator on a display of the aircraft as a function of the target sideslip.

In some embodiments, the program instructions are further executable by the processing unit for visually modifying the display of the aircraft to indicate that the sideslip indicator is positioned as a function of the target sideslip.

BRIEF DESCRIPTION OF THE DRAWINGS

Further features and advantages of the present invention will become apparent from the following detailed description, taken in combination with the appended drawings, in which:

FIG. 2 is a flowchart of an example method for providing sideslip guidance for an aircraft;

FIG. 4 is a block diagram of an example sideslip guidance system;

FIGS. 6A-6B are examples of a primary flight display with and without an OEI sideslip indicator.

It will be noted that throughout the appended drawings, like features are identified by like reference numerals.

DETAILED DESCRIPTION

Figure 1:
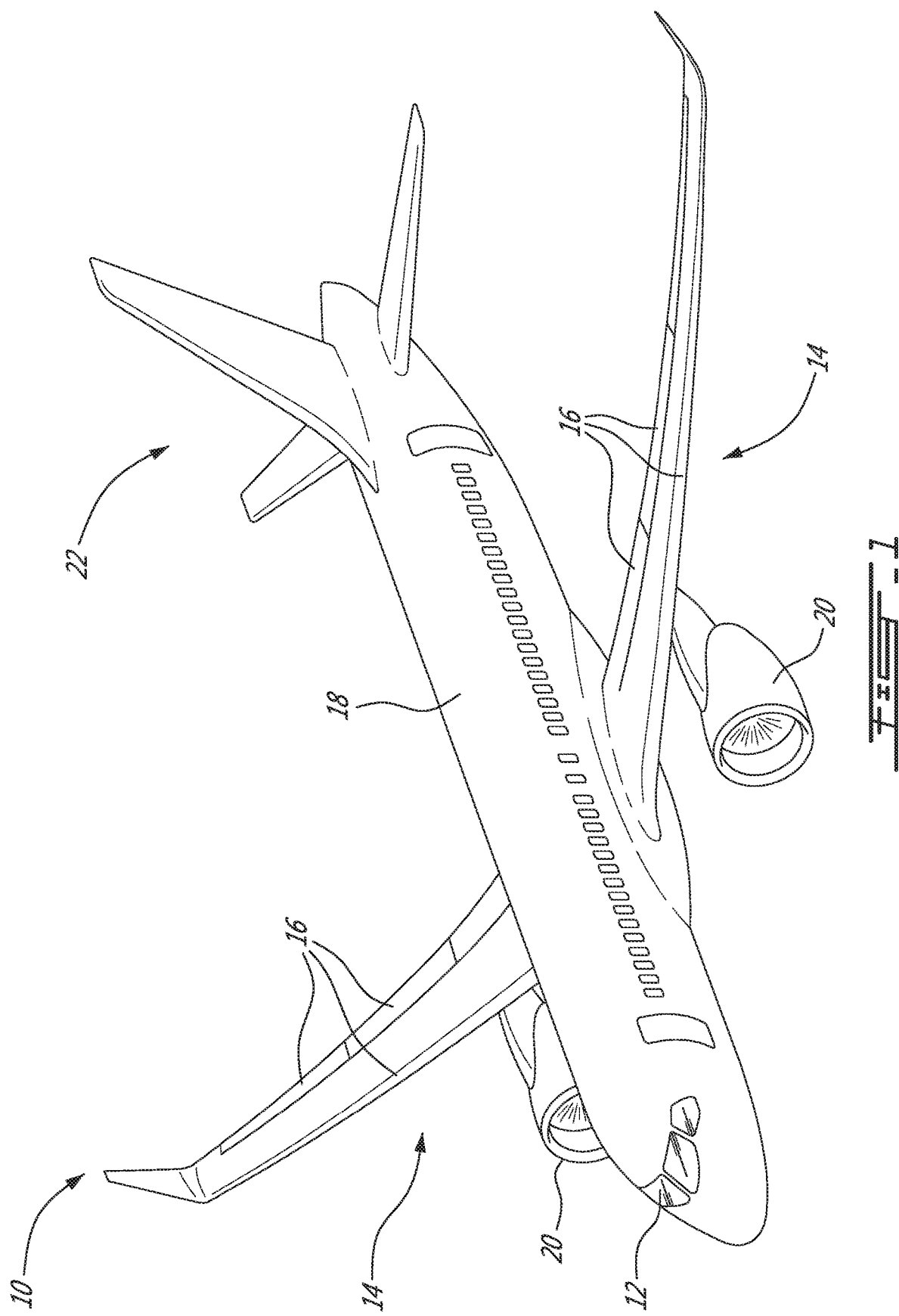
FIG. 1 is a diagram of an example aircraft.

With reference to FIG. 1, an exemplary aircraft 10 is shown. The aircraft 10 may be any type of aircraft such as a propeller plane, jet plane, turbojet plane, turbo-propeller plane, and the like. For example, the aircraft 10 may be a narrow-body, twin-engine jet airliner. The aircraft 10 may be a fixed-wing aircraft. The aircraft 10 may comprise flight control components 16, wings 14, fuselage 18, engines 20 and empennage 22 of known or other type. In the embodiment illustrated, a respective single engine 20 is mounted on each of the wings 14. That is, a first engine and a second engine are shown. However, one or more of engines 20 may be mounted to one or more of wings 14. Alternatively, or in addition, one or more of engines 20 may be mounted to fuselage 18 or be installed on the aircraft 10 in any suitable manner.

A cockpit 12 may be positioned at any suitable location on the aircraft 10, for example at a front portion of the fuselage 18. The cockpit 12 is configured for accommodating one or more pilots who may control the operation of the aircraft 10 by way of one or more operator controls. The operator controls may include any suitable number of pedals, yokes, steering wheels, centre sticks, flight sticks, levers, knobs, switches, and the like.

The flight control components 16 can be positioned at any suitable location on the aircraft, and may include any suitable number of ailerons, airbrakes, elevators, flaps, slats, flaperons, rudders, spoilers, spoilerons, stabilizers, trim tabs, and the like. In some embodiments of the aircraft 10, each wing 14 is equipped with at least one flap. Flaps refer to a trailing edge control components 16 of the wings 14. Flaps are typically a type of high-lift device used to increase the lift of the wing 14 at a given airspeed. Aileron refers to a control components 16 typically forming part of the trailing edge of the wings 14. Ailerons are typically used in pairs to control the aircraft 10 in roll or movement around the aircraft's longitudinal axis. In accordance with an embodiment, the aircraft 10 comprises a first aileron on a first wing and a second aileron on a second wing. The aircraft 10 can also be equipped with any number of additional suitable flight control components 18. In some further embodiments, the flight control components 16 include one or more thrust vectoring elements. The flight control components may be controlled via the operator controls.

With reference to FIG. 2, there is illustrated a flowchart of an example method 200 for providing sideslip guidance for an aircraft, such as the aircraft 10 of FIG. 1. While the method 200 is described herein with reference to the aircraft 10, the method 200 may be applied to other types of aircraft.

At step 202, an initial target sideslip is determined based on current operating conditions of the aircraft 10. The current operating conditions of the aircraft 10 for determining the initial target sideslip may vary depending on the practical implementation. For example, the current operating conditions may comprise one or more of an airspeed of the aircraft, a flap configuration of the aircraft, and an engine operating status for each engine of the aircraft. The airspeed of the aircraft 10 may be determined by monitoring the actual airspeed. Airspeed refers to the speed of the aircraft 10 relative to the air. The airspeed may refer to a calibrated airspeed. Flap configuration refers to a configuration of one or more of the flight control components 16. Accordingly, the current operating conditions may comprise the configuration of one or more of the flight control components 16. In accordance with an embodiment, flap configuration refers to the configuration of the flaps of the aircraft 10, which may change throughout the flight. In some embodiments, the flap configuration refers to a lever position for controlling the flaps of the aircraft 10. The lever positions may be positions of the lever used for take-off, landing and/or go-around maneuvers. Engine operating status refers to whether all of the engines 20 are operative or whether one or more of the engines 20 is inoperative. When all of the engines 20 are operative this may be referred to as all engines operative (AEO) and when one or more of the engines 20 is inoperative this may be referred to as one engine inoperative (OEI). Accordingly, the current operating conditions may depend on if the aircraft 10 is AEO or OEI.

In some embodiments, the initial target sideslip is determined independent of certain conditions such as aircraft weight, ambient temperature, altitude, speed and/or any other suitable conditions. Accordingly, the initial target sideslip may provide a gross estimate that may be refined using additional data, as will be explained in more detail below.

In some embodiments, the initial target sideslip is determined based on tabulated data corresponding to the current operating conditions.

At step 204, a sideslip offset is determined based on a difference between an actual position of at least one aileron of the aircraft 10 and a neutral position of the at least one aileron. The determination of the sideslip offset may vary depending on the practical implementation. Each aileron may deflect upwards or may defect downwards from the neutral position of the aileron. The neutral position of an aileron refers to the aileron being generally aligned with the trailing edge of the wing 14. The upwards or downwards deflection of an aileron may correspond to an angle of deflection from the neutral position. In accordance with an embodiment, the actual position of an aileron refers to an angle of deflection of the aileron from the neutral position. The actual position of an aileron may be a value in degrees, radians and/or any other suitable value.

At step 206, the initial target sideslip is adjusted using the sideslip offset to generate an adjusted target sideslip. The adjusting of the initial target sideslip with the sideslip offset may be done to reduce any inaccuracies with the initial target sideslip, any inaccuracies with an actual sideslip the aircraft 10 is flying at, and/or any inaccuracies with data of a flight management system. As the initial target sideslip may be determined independent of certain conditions such as aircraft weight, ambient temperature, altitude, speed and/or any other suitable conditions, the adjustment of the initial target sideslip with the sideslip offset may be done to refine the initial gross estimate for target sideslip.

The adjusted target sideslip may correspond to a value where no or minimal aileron and/or multifunction spoiler deployment is provided. In some embodiments, the sideslip offset is added to the initial target sideslip to generate the adjusted target sideslip. Other operations (e.g., subtraction, multiplication, division, etc.) for adjusting the initial target sideslip with the sideslip offset are also contemplated.

At step 208, an actual sideslip of the aircraft 10 is obtained. The actual sideslip of the aircraft may be obtained by estimation. The actual sideslip of the aircraft 10 may be determined based on aircraft operating parameters. Aircraft operating parameters refers to any suitable parameters of the aircraft 10 that may be used to determine the actual sideslip of the aircraft 10. The actual sideslip of the aircraft 10 may be estimated based on aircraft operating parameters in any suitable manner. In accordance with an embodiment, the aircraft operating parameters comprise one or more of a rudder deflection, an aircraft weight, and dynamic pressure, body axis lateral load factor. The rudder deflection refers to an angle of deflection of the rudder from a neutral position. The body axis lateral load factor refers to the ratio of the side force exerted on an aircraft 10 to its weight. Other parameters are also contemplated for the aircraft operating parameters. The aircraft operating parameters may be measured during aircraft operation or may be obtained from other data.

In some embodiments, the actual sideslip is measured. For example, a measurement of actual sideslip may be provided and used at step 208. A real-time sideslip angle may be provided from lateral acceleration measurements and/or sensors for determining the actual sideslip.

At step 210, a target sideslip is provided as a difference between the adjusted target sideslip and the actual sideslip. In accordance with some embodiments, the adjusted target sideslip is subtracted from the actual sideslip to determine the target sideslip. In some embodiments, a target sideslip gain factor is applied to the difference between the adjusted target sideslip and the actual sideslip. Additional filtering may also be performed.

In some embodiments, providing the target sideslip comprises displaying the target sideslip to a pilot on a display in the cockpit of the aircraft. For example, a sideslip indicator may be displayed as a function of the target sideslip. The sideslip indicator may display a delta between a current sideslip and the target sideslip, it may display the target sideslip, or it may display both. The pilot may then command sideslip of the aircraft on the basis of the sideslip guidance. For example, the pilot may view the target sideslip displayed and adjust operator controls to the target sideslip.

In some embodiments, providing the target sideslip comprises sending the target sideslip to an autopilot program implemented on a computing device of the aircraft. Accordingly, the autopilot program may make appropriate adjustments to the sideslip of the aircraft on the basis of the sideslip guidance. In this situation, the target sideslip may or may not be displayed. In some embodiments, the actual sideslip of the aircraft is displayed, either instead of or in addition to the target sideslip.

Figure 3A:
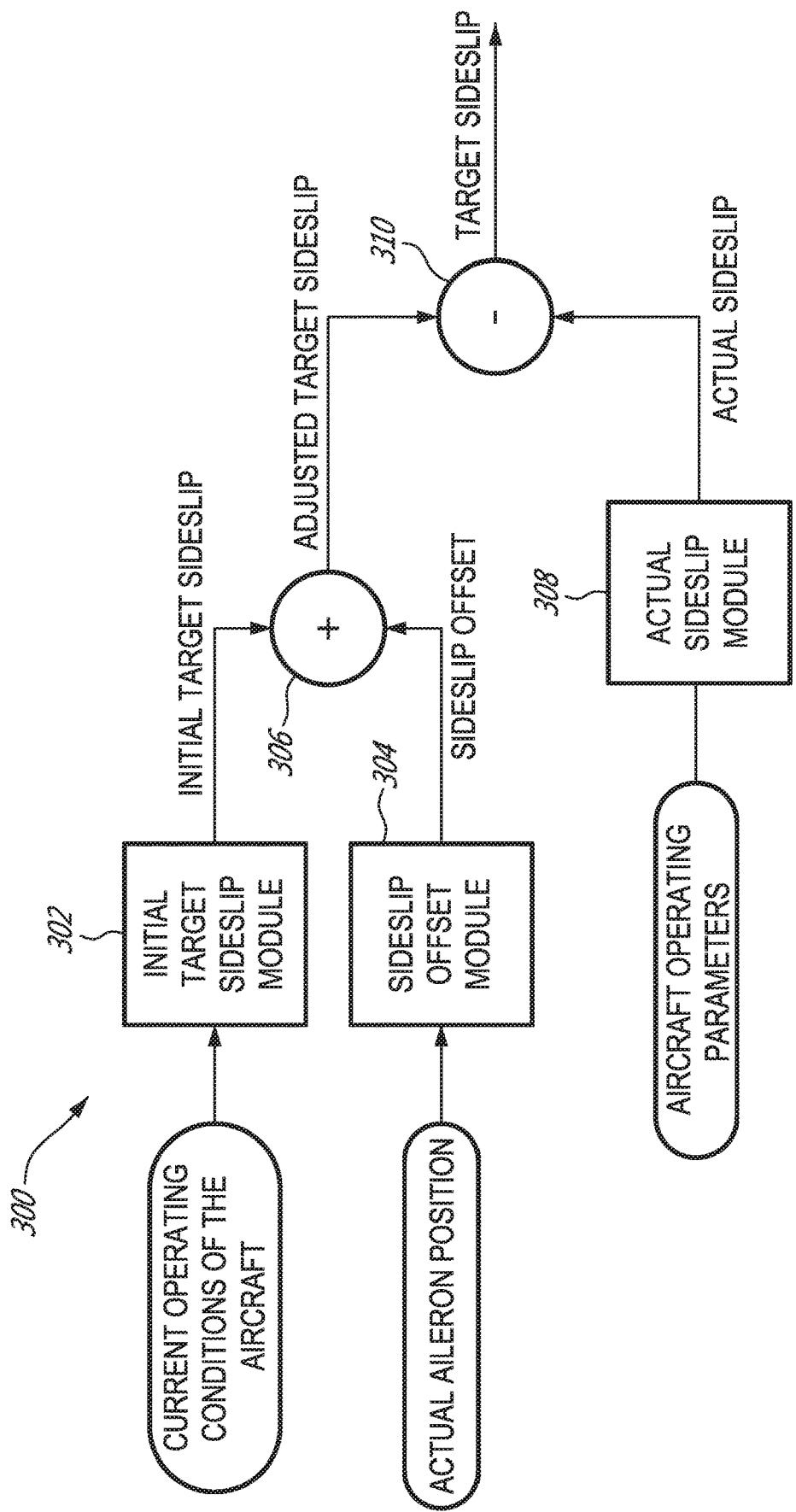
FIG. 3A is an example schematic for determining a target sideslip.

With additional reference to FIG. 3A, a schematic 300 is illustrated for determining the target sideslip in accordance with some embodiments. It should be appreciated that FIG. 3A illustrates a specific and non-limiting implementation of method 200. The implementation of method 200 may vary depending on practical implementations.

The schematic 300 illustrates an initial target sideslip module 302 for performing step 202, a sideslip offset module 304 for performing step 204, an adder 306 for performing step 206, an actual sideslip module 308 for performing step 208, and a subtractor 310 for performing step 210. The modules 302, 304 and 308, the adder 306, and the subtractor 310 are provided for example purposes to illustrate an example implementation of the steps of the method 200. While the modules 302, 304 and 308, the adder 306, and the subtractor 310 are illustrated separately, they may be combined in any suitable manner.

In accordance with some embodiments, the initial target sideslip module 302 determines the initial target sideslip based on the current operating conditions of the aircraft 10. The initial target sideslip may be determined based on a formula, a mathematical function, a lookup table and/or any other suitable technique that may be used to determine the initial target sideslip. The initial target sideslip may be determined by engineering simulators, computer simulation, modeling and/or processing. The computer simulation, modeling and/or processing may be done in real-time during performance of the method 200 or may be predetermined. Accordingly, determining the initial target sideslip may comprise selecting a predetermined value based on the current operating conditions of the aircraft 10, for example from a look-up table.

The initial target sideslip may be determined using at least one of the airspeed of the aircraft 10 and the flap configuration of the aircraft 10 as the current operating conditions. For example, the initial target sideslip may be determined based on both the airspeed and the flap configuration. By way of another example, the initial target sideslip may be determined based on the airspeed of the aircraft 10. The initial target sideslip may be selected from a look-up table. Accordingly, the initial target sideslip may be determined by selecting a value from a lookup table comprising predetermined values as a function of current operating conditions of the aircraft 10.

The initial target sideslip may be determined by linear interpolation of airspeed from a lookup table. For example, if the airspeed is 115 knots, then it may be linearly interpolated from the initial target sideslips for 110 knots and 120 knots, that the initial target sideslip for 115 knots may be 2.45 knots.

In determining the initial target sideslip, the engine operating status for each engine 20 of the aircraft 10 may be used. For example, if the first engine is operative and the second engine is inoperative, then the initial target sideslip is given a positive (+) value. Similarly, for example, if the second engine is operative and the first engine is inoperative, then the initial target sideslip is given a negative (−) value. The first engine may correspond to the left engine and the second engine may correspond to the right engine. Left and right sides correspond to sides from a point of view looking from the rear of the aircraft 10 towards the front of the aircraft 10.

In accordance with some embodiments, the sideslip offset module 304 determines the sideslip offset using the actual position of the at least one aileron of the aircraft 10 and the neutral position of the at least one aileron. In some embodiments, the actual position of the at least one aileron is as an average of an actual position of the first aileron and an actual position of the second aileron.

Figure 3B:
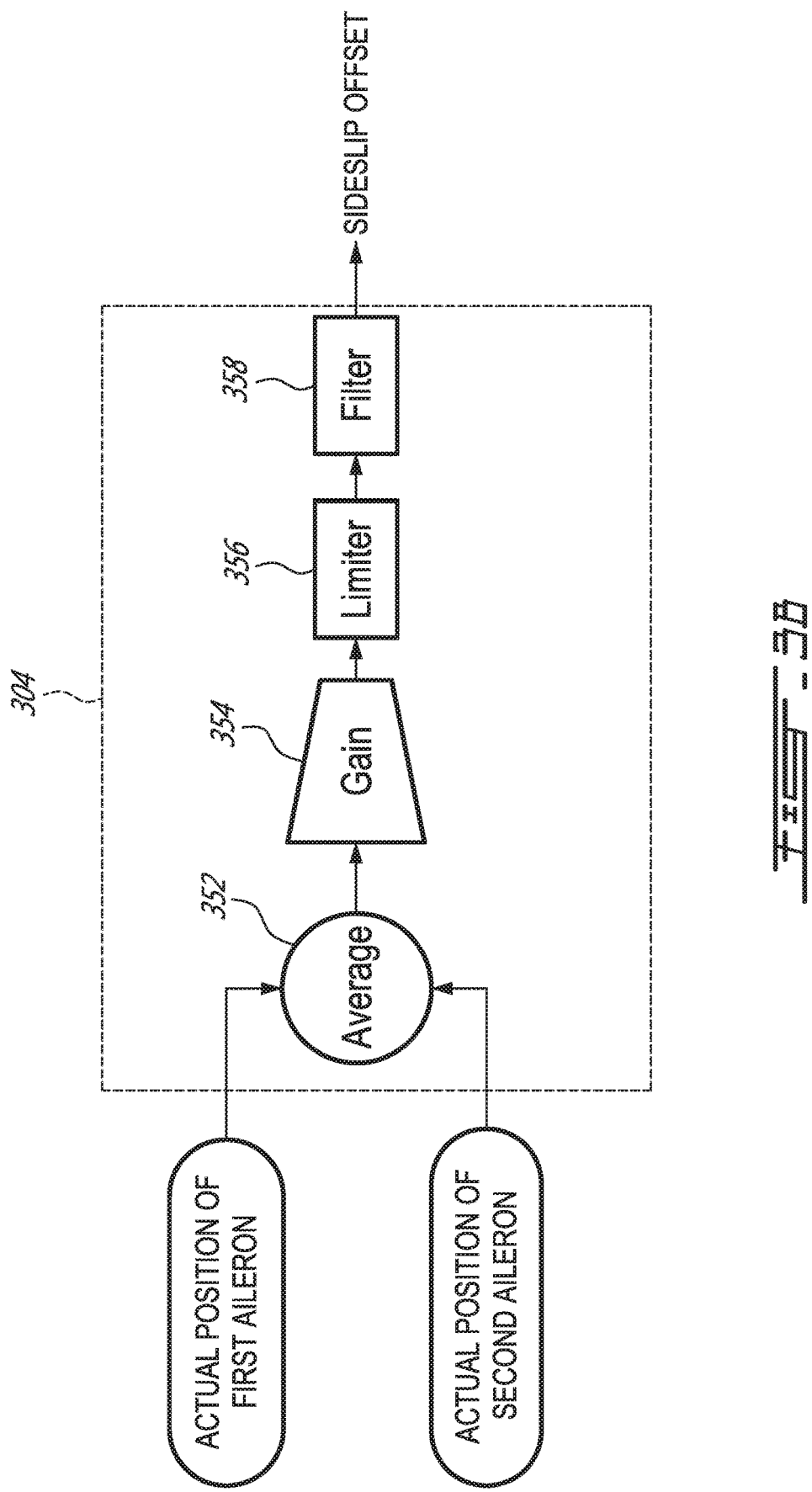
FIG. 3B is an example schematic for determining a sideslip offset based on aileron position.

With reference to FIG. 3B, a specific and non-limiting example of the sideslip offset module 304 is illustrated. An average 352 is taken of the actual position of the first aileron and the actual position of the second aileron to determine an average aileron position. A gain 354 is applied to the average aileron position to determine an adjusted average aileron position. The gain 354 may be set to any suitable value. For example, the gain 354 may be set to one of 0.5, 0.6, 0.7, 0.8 or 0.9. Other values for the gain 354 are also contemplated. A limiter 356 is applied to the adjusted average aileron position to determine a maximum sideslip correction due to sideslip offset. The limiter 356 may be set to any suitable value. For example, the limiter may limit the adjusted average aileron position to plus or minus (+ or −) 0.5, 1, 1.5 2, 2.5 or 3 degrees. Other values for the limiter 356 are also contemplated. A filter 358 is applied to the maximum sideslip correction due to sideslip offset to change a rate at which sideslip guidance is modified on the display, so as to prevent changes to the sideslip guidance due to dynamic movement of the ailerons. The filter 358 may be any suitable filter. For example, the filter may be a first-order low pass filter represented by Laplace transform 1/(1+Ts), where T is the time constant. The time constant may be set to any suitable value. For example, the time constant may be set to one of 20, 25, 30, 35, or 40 seconds. Other values for the time constant are also contemplated. Other types of filers for the filter 358 are also contemplated.

The first aileron may correspond to the left aileron and the second aileron may correspond to the right aileron. For the first aileron, a trailing edge down may correspond to a negative number for the actual position of the first aileron. Similarly, for the second aileron, a trailing edge down may correspond to a positive number for the actual position of the second aileron.

Referring back to FIG. 3A, in accordance with some embodiments, at the adder 306, the initial target sideslip is adjusted using the sideslip offset due to aileron position to generate the adjusted target sideslip. In this specific and non-limiting example, the sideslip offset is added to the initial target sideslip to generate the adjusted target sideslip.

In accordance with some embodiments, the actual sideslip module 308 obtains the actual sideslip. In this example, the actual sideslip is estimated based on the aircraft operating parameters.

For example, the actual sideslip may be estimated based on the following equation:

$$\beta_{estimate} = \frac{\left[\frac{W*N_y}{Q*S_{REF}}\right] - [CY_{RUD}*\delta_{RUD}]}{CY_\beta} \quad (1)$$

In equation (1), $\delta_{RUD}$ corresponds to the actual rudder deflection in degrees, W corresponds to aircraft weight in pounds (lbs), Q corresponds to dynamic pressure in pounds per square foot (lb/ft$^2$), $N_y$ corresponds to a body axis lateral load factor, $CY_{RUD}$ corresponds to a coefficient based on a side force induced by the rudder, $CY_\beta$ corresponds to a coefficient based on a side force induced by sideslip, and $S_{REF}$ corresponds to wing reference area in ft$^2$. $CY_{RUD}*\delta_{RUD}$ may be obtained from a lookup table. If the weight is not available, a default weight may be used for W.

In accordance with some embodiments, at the subtractor 310, the target sideslip is provided as a difference between the adjusted target sideslip and the actual sideslip. In this example, the actual sideslip is subtracted from the adjusted target sideslip to generate the target sideslip.

The target sideslip gain factor may be applied to the target sideslip. That is, the difference between the adjusted target sideslip and the actual sideslip may be adjusted by the target sideslip gain factor. A filter may be applied to the output of the target sideslip. For example, the difference between the adjusted target sideslip and the actual sideslip may be filtered by the filter. By way of another example, the difference between the adjusted target sideslip and the actual sideslip after being adjusted by the target sideslip gain factor may be filtered by the filter.

The engines may be monitored to detect an occurrence of an engine failure of at least one engine 20 of the aircraft 10. The method 200 may be performed when an engine failure is detected. For example, sideslip guidance provided by conventional methods may be switched to provide sideslip guidance according to method 200, in response to detecting an engine failure.

In accordance with some embodiments, when an engine failure is detected, an operating mode of the aircraft 10 may be determined. A first operating mode corresponds to the aircraft 10 being in a takeoff maneuver when an engine failure occurs after the aircraft 10 has passed an aircraft takeoff decision speed. A second operating mode corresponds to the aircraft 10 being in an approach to landing when an engine failure occurs and the aircraft 10 is above a decision height for a go-around maneuver. A third operating mode corresponds to the aircraft 10 being in an approach to landing when the engine failure occurs, the aircraft 10 is above a decision height for a go-around maneuver, and autopilot is engaged. The method 200 may be performed when the operating mode of the aircraft 10 is in one of the aforementioned operating modes. Other operating modes are also contemplated.

By way of a specific and non-limiting example, further details of the first operating mode are as follows. If the engine failure occurs after the aircraft 10 has passed an aircraft takeoff decision speed, the takeoff is continued and the pilot uses the rudder to stay on a runway centerline. At a pre-established rotation speed, the pilot rotates the aircraft pitch attitude commanded by a pitch target and ensures that the takeoff safety speed is achieved at screen height. When airborne, with a positive rate of climb, the pilot sets the gear up. The pilot uses the rudder to track runway heading. After liftoff, sideslip guidance according to method 200 may be performed. The pilot adjusts the rudder position to set the sideslip guidance to zero and controls heading conventionally with bank, while keeping the sideslip guidance at zero with the rudder. At a second height (e.g., 400 feet, 500 feet, etc.), the pilot can consider the use of autopilot (also known as an automatic flight control system) for speed and heading/course tracking. Manual rudder inputs are used to set the sideslip guidance to zero with the autopilot engaged. At a selected acceleration height, the aircraft 10 levels off and starts to accelerate to a target speed. The pilot cleans the flaps from a takeoff position to neutral while respecting a flap retraction speed schedule. Once the flaps are adjusted to a neutral position, the sideslip guidance reverts to conventional sideslip guidance.

By way of a specific and non-limiting example, further details of the second operating mode are as follows. If the engine failure occurs during the approach to landing and the aircraft 10 is above a decision height for a go-around maneuver, the pilot may perform a go-around maneuver. The pilot selects takeoff/go around (TOGA) and sets the thrust levers from advance to go-around thrust. The pilot rotates the aircraft and sets the flaps to go-around. When a positive rate of climb is achieved, the landing gear is retracted and the speed is set to VAC (approach climb speed) or VGA (go-around speed). The pilot uses the rudder to prevent YAW (rotation around the vertical axis). Once a specific engine rotational speed is achieved, gear selector is selected up, and the flap lever is in the go-around flap setting, sideslip guidance according to method 200 may be performed. The pilot adjusts the rudder position to set the sideslip guidance to zero and controls heading conventionally with bank. The pilot monitors the speed in order to maintain a speed no less than a go-around safety speed. Once the go-around maneuver is achieved, the pilot may consider the use of autopilot for speed and heading tracking. Manual rudder inputs are used to maintain the sideslip guidance at zero with autopilot engaged. At a selected go-around acceleration height, the aircraft 10 levels off and starts to increase speed. The pilot cleans the flaps from a takeoff position to neutral while respecting a flap retraction speed schedule. Once the slats/flaps are adjusted to a neutral position, the sideslip guidance reverts to conventional sideslip guidance.

By way of a specific and non-limiting example, further details of the third operating mode are as follows. If the engine failure occurs during the approach to landing with autopilot engaged and the aircraft 10 is above a decision height for a go-around maneuver, the pilot may decide that a go-around maneuver should be performed. The pilot may actuate a takeoff/go-around (TO/GA) switch. A vertical go-around mode of the autopilot commands pitch under a pitch ceiling while maintaining a vertical go-around speed reference. A speed reference may be provided by the flight management system based on a go-around safety speed. Autothrottle sets the throttle at a go-around throttle position. A lateral go-around mode of the autopilot tracks a heading which exists upon selection of go-around using ailerons. The pilot uses the rudder to prevent YAW (rotation around the vertical axis). Once a specific engine rotational speed is achieved, gear selector is selected up, and the flap lever is in a go-around flap setting, sideslip guidance according to method 200 may be performed. The pilot adjusts the rudder position to set the sideslip guidance to zero and the autopilot controls heading conventionally with bank. At a selected go-around acceleration height, the pilot may select a different autopilot vertical mode for level off and speed tracking. The pilot cleans the flaps from a takeoff position to neutral while respecting a flap retraction speed schedule. Once the slats/flaps are adjusted to a neutral position, the sideslip guidance reverts to conventional sideslip guidance.

With reference to FIG. 4, the method 200 may be implemented by a sideslip guidance system 400 comprising a computing device 510. In some embodiments, one or more sensors 402 and/or one or more display devices 410 are also provided. The one or more sensors 402 may be operatively coupled to computing device 510 for transmitting data from the one more sensors 402. The one or more sensors 402 may comprise an airspeed sensor for measuring the airspeed of the aircraft 10. The one or more sensors 402 may comprises a flap configuration sensor for measuring the position of one or more flaps. In some embodiments, the flap position may be determined from the position of the lever for controlling the flap. The one or more sensors 402 may comprise aileron sensors for measuring the actual position of the ailerons. The one or more sensors 402 may comprise a weight sensor for measuring weight of the aircraft 10. The one or more sensors 402 may comprise a dynamic pressure sensor for measuring dynamic pressure. The one or more sensors 402 may comprise one or more sensors for determining lateral load. The one or more sensors 402 may comprise a rudder deflection sensor for measuring the rudder deflection angle. The one or more sensors 402 may comprise an engine failure sensor for determining the engine failure status for the aircraft 10. The engine operating status may be determined from the engine failure status. The one or more sensors 402 may comprise any other type of suitable sensor(s). For example, the one or more sensors 402 may comprise a pitch sensor, a pitch rate sensor, an altitude sensor, a lateral acceleration sensor, a yaw rate sensor, a roll angle sensor and/or a roll rate sensor. In some embodiments, the sensors 402 are separate from the sideslip guidance system 400 and/or may be existing parts of the aircraft 10. The sensors 402 may be used for the purposes of implementing the method 200. In some embodiments, data described herein as coming from the sensors 402 are provided by one or more other aircraft computing device.

The display device 410 may comprise any kind of display such as an LCD (liquid crystal display), an LED (light emitting diode) display, a CRT (cathode ray tube) display, a HUD (Heads-up Display), a PFD (primary flight display) and/or any other suitable display device. A HUD is any transparent display that presents data in the pilot or co-pilot's field of vision without obstructing the view. A PFD is an aircraft instrument dedicated to flight information. The display device 410 may display sideslip guidance as calculated by the computing device 510. The computing device 510 may cause a GUI (graphical user interface) to display sideslip guidance on the display device 410. The display device 410 may be used for the purpose of displaying a slip indicator. In some embodiments, the display device 410 is separate from the sideslip guidance system 400 and/or may be an existing part of the aircraft 10.

Figure 5:
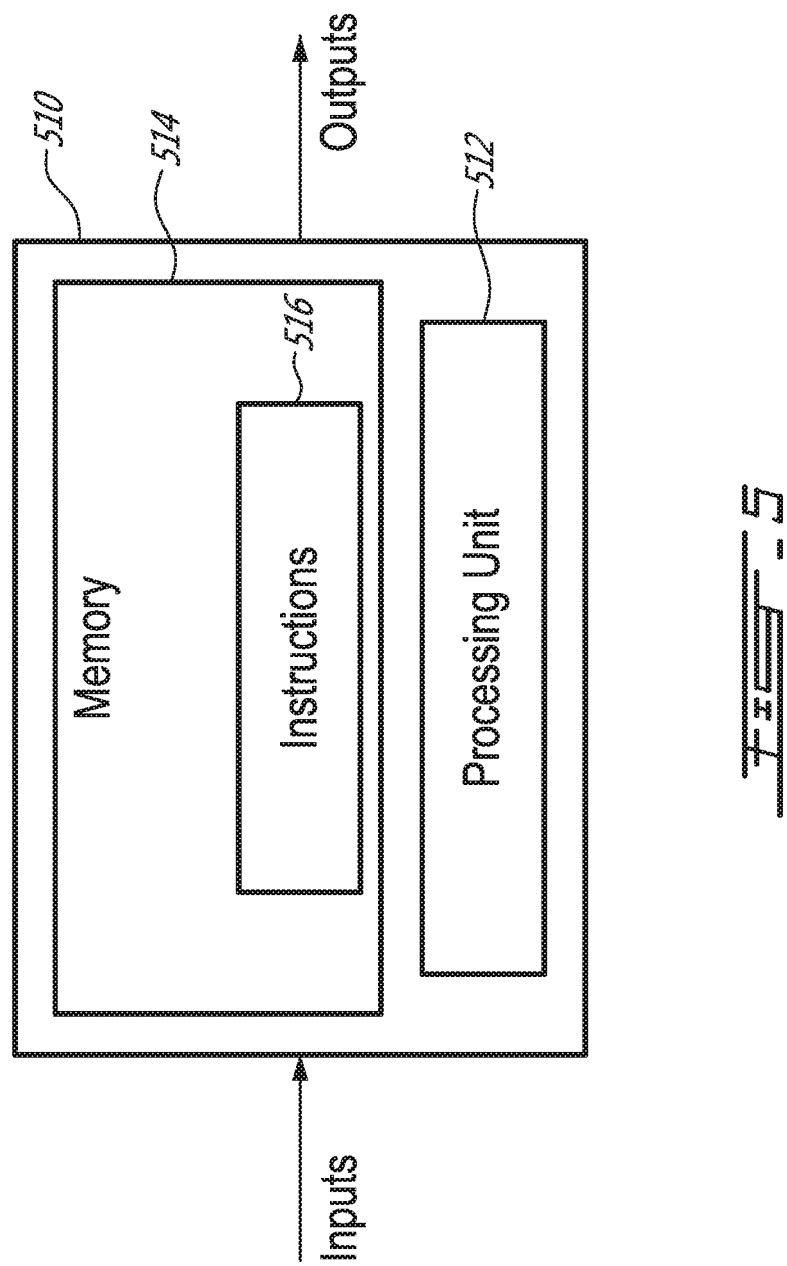
FIG. 5 is a block diagram of an example computing device.

With additional reference to FIG. 5, the computing device 510 comprises a processing unit 512 and a memory 514 which has stored therein computer-executable instructions 516. The processing unit 512 may comprise any suitable devices configured to implement the method 200 such that instructions 516, when executed by the computing device 510 or other programmable apparatus, may cause the functions/acts/steps performed as part of the method 200 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

The methods and systems for providing sideslip guidance described herein may be implemented in a high level procedural or object oriented programming or scripting language, or a combination thereof, to communicate with or assist in the operation of a computer system, for example the computing device 510. Alternatively, the methods and systems for providing sideslip guidance may be implemented in assembly or machine language. The language may be a compiled or interpreted language. Program code for implementing the methods and systems for providing sideslip guidance may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for providing sideslip guidance may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 200. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

When the method 200 is not being performed, the sideslip indicator may provide sideslip guidance according to conventional techniques. When the method 200 is performed, the step of providing the target sideslip may comprise positioning the sideslip indicator on the display device 310 as a function of the target sideslip. For example, the sideslip indicator may be shifted by the target sideslip so that the pilot's objective remains to align the slip indicator with a roll pointer. By way of an example, if sideslip is being provided by used of a slip ball index on the PFD, the slip ball index may be modified by shifting the slip ball index by the target sideslip.

Figure 6A:
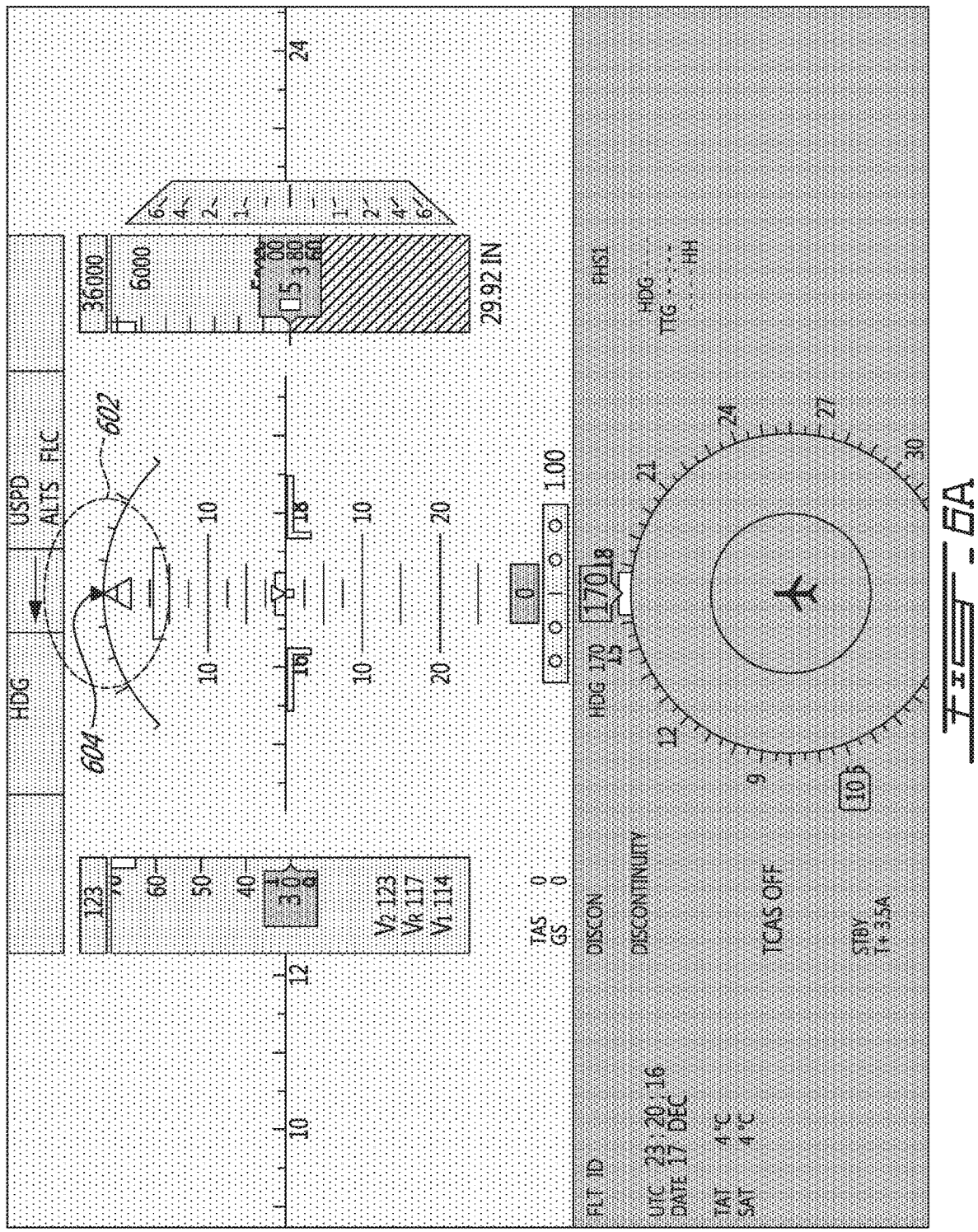

In some embodiments, the sideslip guidance as displayed comprises supplementing a traditional sideslip indicator with an additional marker to represent OEI sideslip guidance. FIG. 6A illustrates an example embodiment whereby sideslip guidance 602 is provided with a traditional sideslip indicator 604. FIG. 6B illustrates an example embodiment whereby sideslip guidance is supplemented with an OEI sideslip indicator 606. The OEI sideslip indicator 606 may be provided in a different color than the sideslip indicator 604. Other differences can include the shape, size, and location of the OEI sideslip indicator 606 compared to the sideslip indicator 604.

The method 200 may further comprise visually modifying the display device to indicate that the sideslip indicator is positioned as a function of the target sideslip. Visual modification of the display may include one or more of the use of color, flashing markers, displayed text, enhanced size, modified shape, and the like. Accordingly, by indicating that the sideslip indicator is positioned as a function of the target sideslip, the pilot is made aware that the sideslip guidance is being provided according to method 200.

It should be appreciated that when sideslip guidance is provided according to method 200, a zeroed demand (roll pointer and index alignment) may make the sideslip equal to the target sideslip.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for providing sideslip guidance may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for providing sideslip guidance for an aircraft, the method comprising:
   detecting an engine operating status corresponding to one engine inoperative (OEI);
   in response to detecting the OE status, determining an initial target sideslip based on current operating conditions of the aircraft and the engine operating status;
   determining a sideslip offset based on an actual position of at least one aileron of the aircraft and a neutral position of the at least one aileron;
   adjusting the initial target sideslip using the sideslip offset to generate an adjusted target sideslip;
   obtaining an actual sideslip of the aircraft;
   determining a target sideslip as a difference between the adjusted target sideslip and the actual sideslip; and
   sending control signals to a display of the aircraft to position an OEI sideslip indicator on the display as a function of the target sideslip to supplement a traditional sideslip indicator.

2. The method of claim 1, wherein determining the initial target sideslip comprises using at least one of an airspeed of the aircraft and a flap configuration of the aircraft as the current operating conditions.

3. The method of claim 1, further comprising determining the actual position of the at least one aileron as an average of an actual position of a first aileron and an actual position of a second aileron.

4. The method of claim 1, wherein obtaining the actual sideslip of the aircraft comprises estimating the actual sideslip of the aircraft.

5. The method of claim 4, wherein estimating the actual sideslip comprises:
determining an initial sideslip estimate using aircraft operating parameters; and
adjusting the initial sideslip estimate by a gain factor.

6. The method of claim 1, further comprising:
determining an operating mode of the aircraft;
wherein the method is performed when the operating mode of the aircraft is one of:
at takeoff when the OEI status occurs after the aircraft has passed an aircraft takeoff decision speed; and
at an approach to landing when the OEI status occurs when the aircraft is above a decision height for a go-around maneuver.

7. The method of claim 6, wherein the operating mode at the approach to landing comprises having autopilot engaged.

8. The method of claim 1, further comprising visually modifying the display of the aircraft to indicate that the OEI sideslip indicator is positioned based on the target sideslip.

9. A system for providing sideslip guidance for an aircraft, the system comprising:
a computing device having a processor and a non-transitory computer-readable memory having stored thereon program instructions executable by the processor for:
determining an initial target sideslip based on current operating conditions of the aircraft;
determining a sideslip offset based on an actual position of at least one aileron of the aircraft and a neutral position of the at least one aileron;
adjusting the initial target sideslip using the sideslip offset to generate an adjusted target sideslip;
obtaining an actual sideslip of the aircraft; and
providing a target sideslip as a difference between the adjusted target sideslip and the actual sideslip;
one or more sensors on the at least one aileron of the aircraft coupled to the computing device for acquiring, the actual position of the at least one aileron for determining the sideslip offset; and
an aircraft display coupled to the computing device for displaying a sideslip indicator on the aircraft display as a function of the target sideslip.

10. The system of claim 9, wherein determining the initial target sideslip comprises using at least one of an airspeed of the aircraft and a flap configuration of the aircraft as the current operating conditions.

11. The system of claim 9, wherein determining the initial target sideslip comprises using an engine operating status for each engine of the aircraft as the current operating conditions.

12. The system of claim 9, wherein the program instructions are further executable by the processor for determining the actual position of the at least one aileron as an average of an actual position of a first aileron and an actual position of a second aileron.

13. The system of claim 9, wherein obtaining the actual sideslip of the aircraft comprises estimating the actual sideslip of the aircraft.

14. The system of claim 13, wherein estimating the actual sideslip comprises:
determining an initial sideslip estimate using aircraft operating parameters; and
adjusting the initial sideslip estimate by a gain factor.

15. The system of claim 9, wherein the program instructions are further executable by the processor for:
detecting an engine failure of at least one engine of the aircraft; and
when the engine failure is detected, determining an operating mode of the aircraft;
wherein the program instructions are executed when the operating mode of the aircraft is one of:
at takeoff when the engine failure occurs after the aircraft has passed an aircraft takeoff decision speed; and
at an approach to landing when the engine failure occurs when the aircraft is above a decision height for a go-around maneuver.

16. The system of claim 15, wherein the operating mode at the approach to landing comprises having autopilot engaged.

17. The system of claim 9, wherein the program instructions are further executable by the processor for:
detecting an engine failure of at least one engine of the aircraft; and
wherein the method is performed when the engine failure is detected.

* * * * *